Sept. 17, 1940. G. W. JOHNSON 2,214,857
FOLDING MACHINE
Filed Oct. 16, 1939 5 Sheets-Sheet 1

INVENTOR
GEORGE W. JOHNSON
BY
*Hyde, Higley & Meyer*
ATTORNEYS

Sept. 17, 1940.    G. W. JOHNSON    2,214,857
FOLDING MACHINE
Filed Oct. 16, 1939    5 Sheets-Sheet 2

INVENTOR
GEORGE W. JOHNSON
BY
ATTORNEYS

Sept. 17, 1940.                G. W. JOHNSON                2,214,857
                              FOLDING MACHINE
                     Filed Oct. 16, 1939          5 Sheets-Sheet 3

INVENTOR
GEORGE W. JOHNSON
BY Hyde, Hagley + Meyer
ATTORNEYS

Sept. 17, 1940.  G. W. JOHNSON  2,214,857
FOLDING MACHINE
Filed Oct. 16, 1939  5 Sheets-Sheet 4

INVENTOR
GEORGE W. JOHNSON
BY *Hyde, Higley & Meyer*
ATTORNEYS

Sept. 17, 1940.    G. W. JOHNSON    2,214,857
FOLDING MACHINE
Filed Oct. 16, 1939    5 Sheets-Sheet 5

INVENTOR
GEORGE W. JOHNSON
BY *Hyde, Higley & Meyer*
ATTORNEYS

Patented Sept. 17, 1940

2,214,857

UNITED STATES PATENT OFFICE 2,214,857

FOLDING MACHINE

George W. Johnson, Cincinnati, Ohio, assignor to The American Laundry Machinery Company, Norwood, Ohio, a corporation of Ohio Application October 16, 1939, Serial No. 299,617

20 Claims. (Cl. 270—62)

This invention relates to machines for folding and stacking flat articles. While the mechanism is usable for any kind of flat articles, it is more particularly adapted for those fabric articles which are more or less soft, flimsy or limp, either on account of the texture or character of the material itself or the manner in which it has been dried. Diapers which have been tumbler dried or otherwise air dried, are in this class. They do not have either the glaze-like finish or body stiffness characteristic of articles finished by an ironing operation, such as napkins or even handkerchiefs, or articles of larger size such as tablecloths, and when turned or folded by turning them over with turning plates, will roll or crumble instead of falling into a definite folding position. Such limp articles also have not been successfully or satisfactorily folded on the usual machines adapted for the stiffer articles, such as napkins.

One object of the invention, therefore, is to provide an improved machine of relatively simple form, capable of convenient operation and durable in use, which satisfactorily produces one or a plurality of folds in limp articles of the kind described, and, when desired, stacks them in neat regular piles.

Another object is to provide an improved machine of this kind in which the folding operation is produced by draping the article over a travelling narrow string-like belt, which not only serves as a support on which the article becomes folded and brought into a vertical plane, but which also serves as a conveyer to carry it and present it to the second folding device.

A further object of the invention is to provide an improved folding machine of the kind described in which a limp article may be folded in one direction by a draping operation into two parallel plies lying in a vertical plane, and may then be folded crosswise of the first fold while still held in a vertical plane, after which, by gravity, the article is transferred to a horizontal position preparatory to stacking.

A further object of the invention is to provide improved means for properly supporting the article and prevent it from falling, crumpling or losing its shape while being subjected to the second or cross fold in a vertical plane, together with means for manipulating the holding device so as to release the article for moving it to a horizontal position for stacking.

A further object is to provide an improved combined folding and stacking machine in which the first fold is accomplished by draping the article as it is moved to position for the second fold, in which the second or cross fold is produced by mechanism sensitive to the article itself, in which a holding device for supporting the article while being subjected to the second folding mechanism is sensitive to travel of the article itself, and in which the stacking operation is controlled by or is sensitive to operation of the said holding device.

A further object is generally to simplify and improve the mechanism for the purpose of providing a satisfactory folding machine for limp articles which will operate continuously, rapidly and effectively; which reduces the number of operating parts and is not liable to get out of order; and which requires minimum attention for purposes of adjustment, repair or other service.

Further objects of the invention are in part obvious and in part will appear more in detail hereinafter.

In the drawings, Fig. 1 represents an elevation of the right hand side of one form of machine embodying the invention, portions of the side panels being broken away to expose interior construction.

Figures 1, 2:
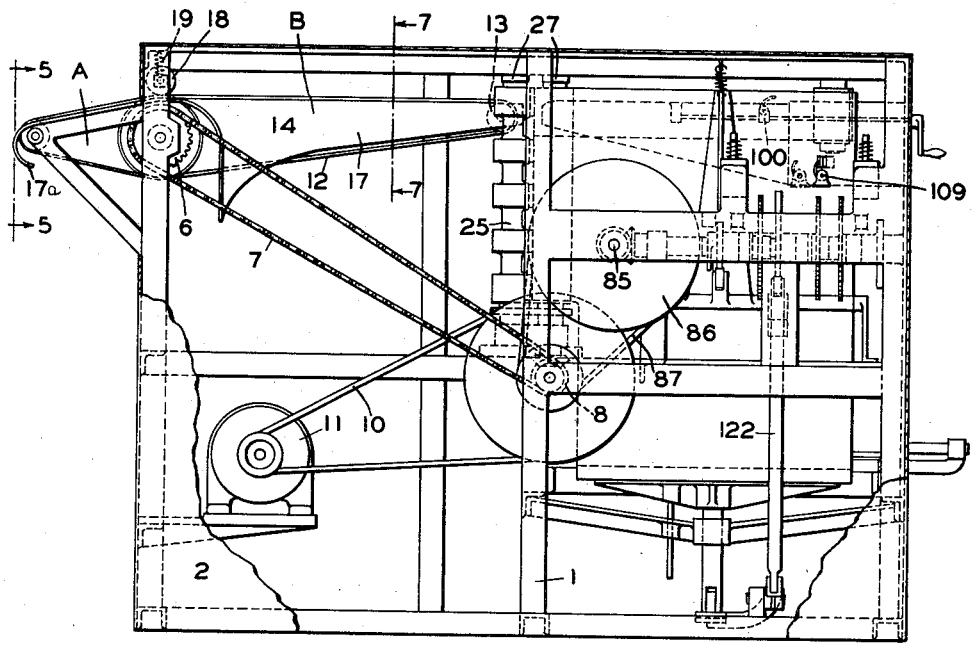
Fig. 2 is a plan view of the machine, again with portions of the enclosing panels broken away.
Figure 17:
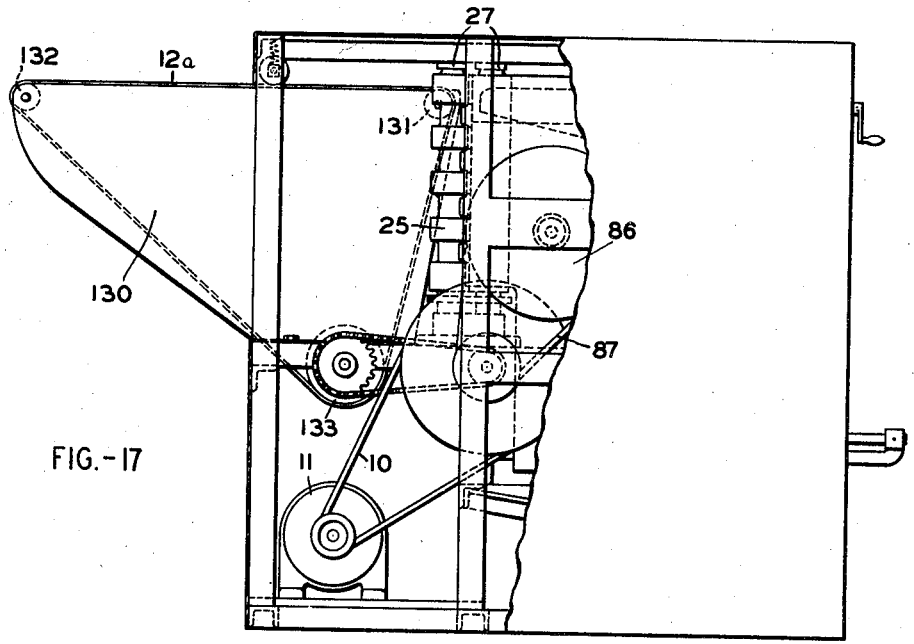
Fig. 17 is a side elevation, corresponding to Fig. 1, and illustrating a modified arrangement of folding string belt.
Figure 18:
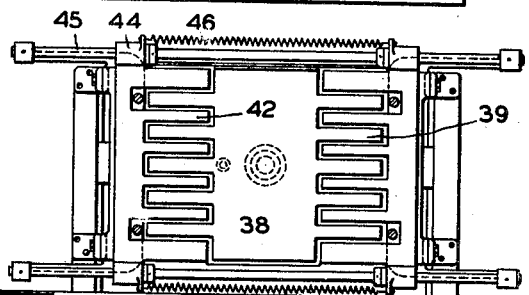

And Fig. 18 is a plan view, corresponding to Fig. 2 and illustrating the machine shown in Fig. 17.

The machine as a whole comprises a suitable framework, marked generally 1, made up of standard shapes welded or otherwise secured together and provided with sheet metal enclosing panels 2 which form a housing for the operating mechanism. The latter comprises feeding mechanism marked generally A, Fig. 1, a primary longitudinal folding unit marked generally B, Fig. 1, a cross folding unit, marked generally C, Fig. 2, a stacking mechanism or device, marked generally D, Fig. 2, and control and operating mechanism marked generally E, Fig. 2, which will be described in order.

Feeding mechanism

The folding machine of this invention may be operatively associated directly with an ironing machine, so that the articles delivered from the ironing machine automatically move directly into the folding machine without operator effort, as will more fully hereinafter appear, but in the arrangement shown in Fig. 1 the machine is intended to be served by an operator who delivers to it one by one the articles, such as diapers, to be folded. Such operator stands at the left of the machine shown in Fig. 1 and lays out the article in flat smooth form upon the upper surface of an endless conveyer consisting of two short endless belts 3 travelling over large and small rollers 4, 5, the former being mounted on a shaft provided with a driven sprocket 6 from which a chain 7 extends to a driving sprocket 8 on the main driving shaft 9 driven in any suitable manner, such as by a V-belt 10 connecting it with a pulley on the shaft of the electric motor 11.

Longitudinal folding unit

Figures 9, 10:
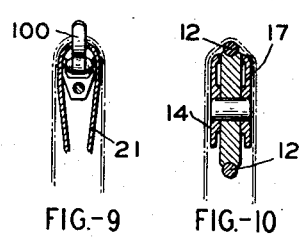
Fig. 9 is a detail section on the line 9—9, Fig. 6.
Fig. 10 is a detail sectional view on the line 10—10, Fig. 2.
Figure 7:
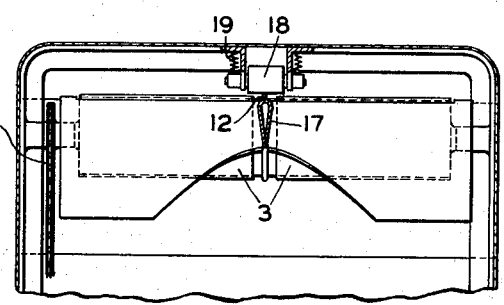
Fig. 7 is a detail sectional elevation on approximately the line 7—7, Fig. 1.
Figure 11:
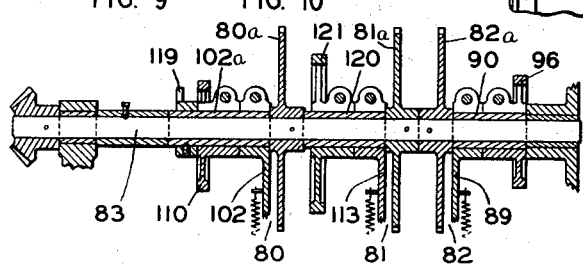
Fig. 11 is a detail sectional plan view on the line 11—11, Fig. 3.

Intermediate its ends roller 4 is provided with a groove to receive a narrow belt 12 of generally string or filamentary form made, for example, of plain flexible steel wire, or a small round wire coil, such as used in motion picture machines, or even a round leather belt. The smaller this belt is the better, because the sharper will be the longitudinal fold which is produced in the article being folded. Endless belt 12 also travels over a pulley 13 housed between and rotatably mounted in the walls of a plate marked generally 14 (Figs. 1 and 10). The upper run of the belt 12 and the upper runs of the belts 3 travel above the same plate, which is peculiarly shaped, being roughly and generally saddle shaped. Its outer portions widens out and extends laterally, forming a table portion 15 lying beneath and supporting the feed belts 3 which pass through slots 16 in said table portion, the extreme outer edge portion being curved downwardly to form a protecting guard, as at 17a. Its inner portion is curved and bent downwardly into parallel walls 17 closely spaced together and which together constitute a form on which an article fed to the belt 12 and moved along by it is gradually draped, with half thereof hanging down on either side. Just inside of the entrance to the machine, where the article being folded is being transferred from belts 3 to belt 12, it is held down upon the belt 12 by a yielding grooved roller 18 biased downwardly by a compression spring 19, said roller not only beginning to produce the first fold by creasing the article around the belt, but insuring driving contact of the article with the belt.

An article delivered to the machine and fed onto the belt 12 moves forwardly with its right and left halves gradually descending until it becomes draped over the upper run of the belt 12 on either side of the two plates 17, and in this folded condition is advanced across a small gap 20, Fig. 2, upon and over a U-shaped double walled plate 21 similar in shape to the innermost portion of the plate 14. With the article draped upon the two plates 17, 21 and spanning the gap 20 between them the second or cross fold is produced.

Cross folding mechanism

The cross fold is performed by a folding blade 22 mounted on an arm 23 pivoted in a suitable bracket 24 supported on the frame, said arm mechanism being actuated by cam mechanism to be later described. Movement of the folding blade 22 through the gap creases the once folded article, draped to hang in a vertical plane, along a vertical center line and advances it into engagement between folding roller mechanism now to be described.

Said mechanism comprises a pair of coacting parallel rollers 25, 26 mounted to rotate on vertical axes and supported at their upper ends in bearings 27 and at their lower ends in a bearing bracket 28. Roller 25 is idle, being driven by contact of the work with it. Said roller is grooved and is adapted to receive fingers 29 along the vertical edge of a holding plate 30 pivoted on a horizontal axis at 31 for movement into and out of engagement with roller 26, toward which it is biased by a spring 32, Fig. 2. The upper end of roller 26 and a pulley 33, Fig. 6, carry an endless belt 34 which is also adapted to be normally and yieldably engaged by the upper portion of the plate 30.

When the article being folded has been advanced by the folding blade 22 into gripping engagement between the rollers 25, 26, it is advanced between them with sufficient pressure to produce a crease along the advancing vertical edge of the article, and it is then carried by the belt 34 between it and the plate 30, along which it slides. This motion continues until all of the now twice folded article lies between plate 30 and belt 34, whereupon the plate 30 is moved about its pivotal axis 31 away from the belt, or toward the left in Fig. 3, sufficiently to release the gripping effect upon the article by plate 30 against belt 34, whereupon the article slides by gravity downwardly over a stationary curved plate 35, which conveys and directs it into the stacking mechanism D.

Figure 3:
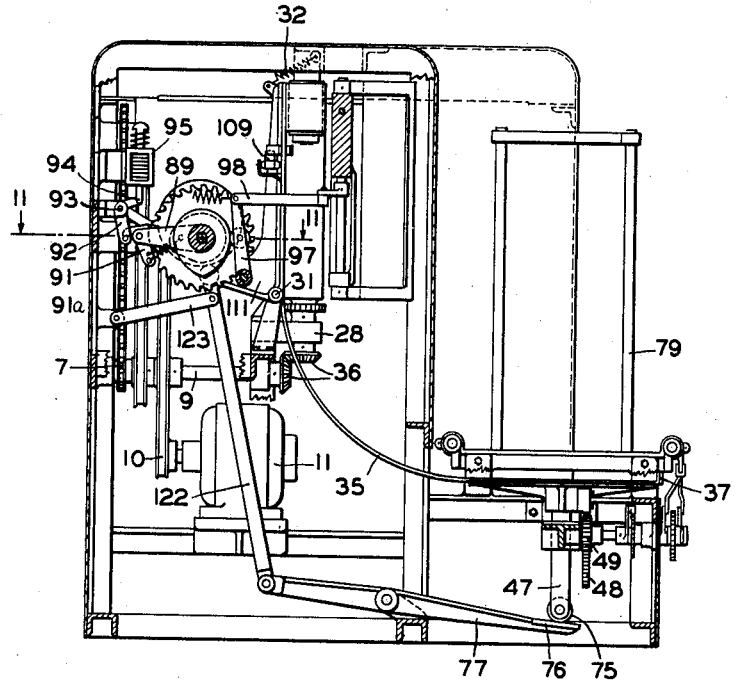
Fig. 3 is a rear elevation, with parts of the frame and panel broken away to expose interior parts.

Rollers 25 and 26 and the belt 34 are driven by the same motor 11 and the main driving shaft 9, which is connected at its inner end to the lower end of roll 26 by bevelled gears 36, Fig. 3.

Stacking mechanism

Plate 35 extends into the stacking mechanism, at the far end of which its edge is turned up to form a stop 37, which stops the article and properly positions it for registration with the lifting plate 38 of the stacking mechanism.

The lifting plate, as shown in Fig. 2, is provided with a plurality of laterally extending fingers 39, lying in recesses or slots in that portion of the plate 35 which extends through the stacking device. In other words, that area of the plate 35 which lies within the stacking device is recessed or cut away with an opening of the same shape as the lifting plate 38, so that when plate 38 lies at the same level as the horizontal portion of plate 35, the two together form a continuous plate along which the article travels to its final position against the stop 37. When in such position, if the lifting plate rises it elevates the article with it.

Above the plates 35 and 38, in the stacking device, are a pair of like stack supporting plates, respectively marked 40, 41, each provided with inwardly extending lateral fingers 42 which register with the spaces between the fingers 39 of the lifting plate 38, so that free movement of the lifting plate above the stack supporting plates 40, 41 when in their stack supporting position shown in Fig. 2, is possible and is permitted.

The two stack supporting plates, 40, 41 have lateral movement toward and from each other, preferably in timed relation with the upward movement of the lifting plate 38, so that as an article upon the plate 38 is lifted with it, the side plates 40, 41, are withdrawn to permit free unobstructed further advance of the article to a level above plates 40, 41, whereupon plates 40, 41 automatically move inwardly to receive and support the stack as a whole, when the lifting plate descends. The construction and arrangement for this purpose is as follows:

Plates 40, 41 at each end are provided with sleeve portions 44 mounted to slide upon rods 45, the two plates being biased toward each other by tension springs 46.

Figure 15:
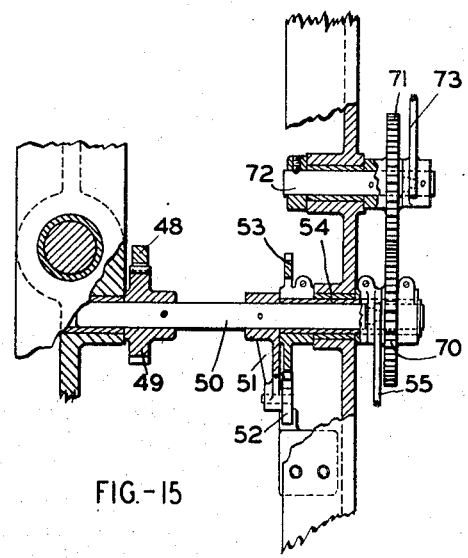
Fig. 15 is a sectional plan view on the line 15—15, Fig. 12.

Lifting plate 38 is provided with a depending operating post 47 which has secured to it a rack 48 meshing with a pinion 49 on a shaft 50, Figs. 3 and 15. Said shaft has pinned to it a lever 51 provided with a pawl 52 normally held in engagement with a ratchet wheel 53, secured to a sleeve 54 in which the shaft 50 is journalled.
Also secured to the sleeve is a lever member 55 connected by a link 69 to a sleeve 44 carried by plate 40.

Also secured to the sleeve 54 is a gear 70 meshing with a gear 71 on a stub shaft 72 provided with an arm 73 corresponding to arm 55 and similarly connected by a link 74 to the other stack supporting plate 41.

The depending post 47 of the lifting plate 38, at its lower end, is provided with a roller 75 for engagement with a pad or plate 76 on one arm of a lever 77 actuated by cam mechanism to be described.

Figure 4:
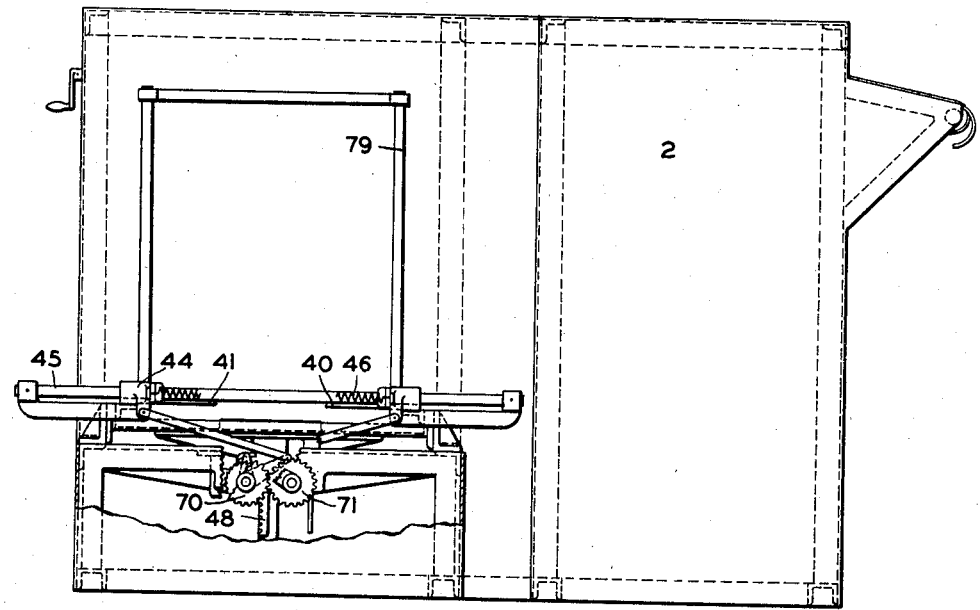
Fig. 4 is an elevation from the right in Fig. 3.
Figure 5:
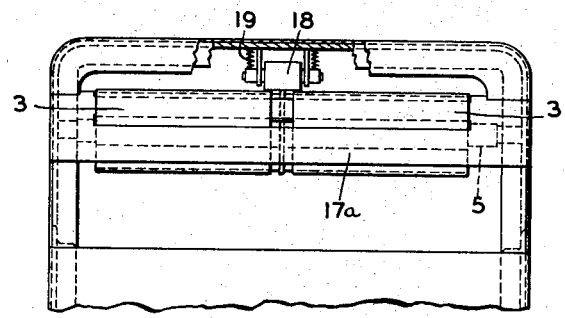
Fig. 5 is a fragmental front elevation at the feeding entrance to the machine, looking in the direction of the arrows 5—5, Fig. 1.
Figure 12:
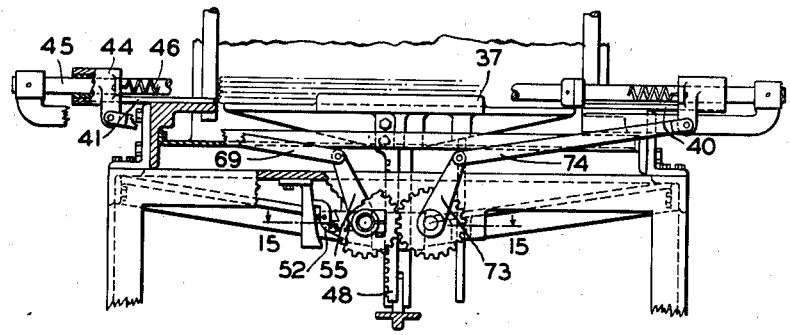
Fig. 12 is a fragmental view, enlarged, illustrating the stacking mechanism as illustrated in Fig. 4, showing the parts in an advanced position intermediate that shown in Figs. 4 and 13.
Figure 13:
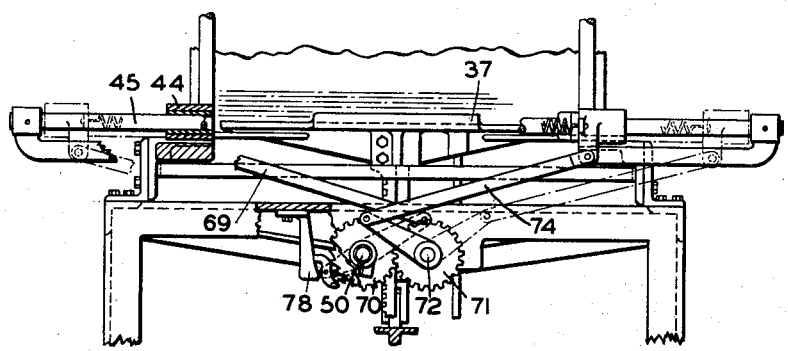
Fig. 13 is a similar view showing the stacking mechanism in fully operated position.

When a twice folded article reaches and is received by and properly presented on the lifting plate, lever 77 is operated and the plate is elevated, the upward movement thereof, through the rack 48 and pinion 49, rotating shaft 50 and turning lever 51, which through its pawl 52 rotates the ratchet wheel 53 and sleeve 54, and through the geared connection 70, 71 causes the two plates 40, 41 to move outwardly upon the rods 45 against the tension of springs 46. Such movement of the plates takes place while the lifting plate 38 is moving from the position shown in Fig. 4 to that shown in Fig. 12. Continued movement of the lifting plate elevates the freshly folded article above the level of the supporting plates 40, 41. When the lifting plate reaches the elevation shown in Fig. 13 the pawl 52 has reached a raised portion on a cam member 78 attached to the frame, which cams the pawl to the out of engagement position with the ratchet wheel, and the springs 46 thereupon become effective to return the plates 40, 41, links 69 and 74, and levers 55, 73 to their original inward positions, with the tongues of plates 40, 41 lying beneath the side edges of the article. Therefore, when the lifting plate 38 is lowered by reverse movement of lever 77 the article and the rest of the pile above it are retained by plates 40, 41 and rest thereon. Suitable guiding posts 79 for the stack may be supported upon the frame or brackets attached thereto.

Control and operating mechanism

The control and operating mechanism, generally designated E, and shown in Figs. 1, 2, 3, 8 and 11, includes three one revolution clutch units numbered respectively 80, 81 and 82. Each includes a continuously rotating ratchet wheel, the said wheels being respectively numbered 80*a*, 81*a*, and 82*a* in Fig. 11, said wheels being pinned to a shaft 83 driven by bevel gears 84 from a shaft 85 having a pulley 86 over which travels a belt 87 connected to a pulley 88 on the main shaft 9, so that motion of the several clutch parts is derived from the same electric motor 11.

Clutch unit 82 controls operation of the folding blade 22. Its ratchet wheel 82*a* is pinned to the shaft 83 and cooperates with a lever 89 fixed to a sleeve 90 which rotates freely on the shaft 83, said lever pivotally supporting a clutch latch 91 in the form of a bell crank, one arm of which has a pin adapted to engage in the teeth of the ratchet wheel and the other arm of which is engaged by a bell crank 92 pivotally mounted upon a shaft 93, the other arm of the bell crank 92 being pivotally connected at 94 to the plunger of a solenoid or electromagnet 95. Sleeve 90 also has fixed to it a cam 96, the shaped peripheral working face of which engages a roller on a lever 97 connected by a link 98 with an arm 99 of the pivoted lever 23 which supports the folding blade 22.

Energization of the solenoid is controlled or produced by operation of a switch 100, the operating arm of which extends through a longitudinal slot in the upper edge of the double plate former 21, as shown in Fig. 2, so that the arm of said switch is in the path of the leading or forward edge of the article as it moves to the right along the plates 17, 21. When the moving article engages the switch lever, the solenoid is energized and its plunger moves downwardly in Fig. 3, rotating bell crank lever 92 clockwise, releasing the clutch latch 91, the spring 91*a* of which moves its pin into engagement with the teeth of the rotating clutch ratchet wheel 82*a*. Thereupon the arm 89 is caused to rotate, carrying with it sleeve 90 and cam 96, the latter of which moves lever 97 and thereby actuates the folding blade to advance and engage the article, folding it along a vertical line midway between its edges, and engaging it between the folding rollers 25, 26, after which the folding blade returns.
Upon completion of one revolution of the clutch unit the bell crank 91 is disengaged from the ratchet wheel, terminating the drive, because bell crank 92 has been released and its lower arm lies in the path of one of the arms of the bell crank 91, which is thereby disengaged from the ratchet, so that the folding blade, by the one revolution of this clutch unit, has been operated through one complete cycle of movements and restored to its original position, ready for another operation.

Figure 6:
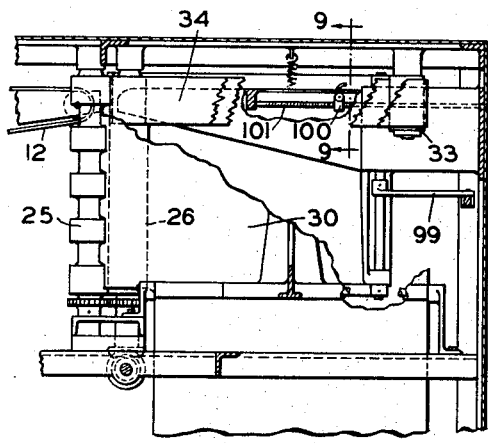
Fig. 6 is a detail sectional elevation on approximately the line 6—6, Fig. 2.

Switch 100 preferably is adjustably mounted, as shown in Figs. 1 and 6, to accommodate various lengths of articles. Accommodation for different widths in connection with the first or longitudinal fold, of course, is taken care of by properly locating the article on the feed belts 3, so that the center line of the article is alined with the string belt 12. The adjustable mounting for switch 100 includes a threaded rod 101, supporting the switch, and adjustable by a crank 101a for setting the switch in any position.

The folding blade 22 is sensitive to the movement or presence of the article to be folded by it.

Figure 8:
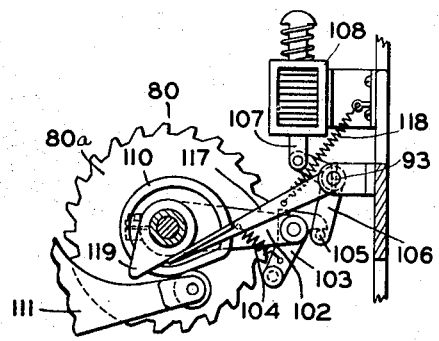
Fig. 8 is a detail sectional view on approximately the line 8—8, Fig. 2.

While in Fig. 3 the bell cranks 91, 92 and associated parts are shown on rather a small scale, the corresponding parts of the next clutch unit 80 are illustrated in Fig. 8 on a larger scale, from which the operation will probably be more apparent.

The next clutch mechanism or unit 80 controls the release of the holding plate 30. This mechanism is also sensitive to or controlled by the article, as will appear more in detail hereinafter. The clutch unit as a whole is identical with or very similar in operation to the one previously described. It is shown in detail in Fig. 8.

Clutch unit 80 includes the clutch wheel 80a pinned to the shaft 83 and cooperating with a lever 102 carrying the bell crank clutch latch 103 biased toward the ratchet wheel by a tension spring 104, one arm of said latch being engaged by a pin 105 on one arm of the bell crank 106 rotatable on shaft 93 and pivotally connected to the plunger 107 of solenoid or electromagnet 108, energization of which is controlled by a switch 109 adjustably mounted on the frame in position to be engaged and operated by the twice folded article when it reaches the proper position for delivery to the stacking mechanism. When the article reaches such position and closes the switch, the solenoid is energized, moving its plunger downwardly in Fig. 8 and releasing the latch 103 for engagement with the ratchet wheel 80a, which thereupon begins to rotate, carrying with it lever 102, the sleeve 102a to which it is attached (Fig. 11) and a cam 110, the curved peripheral face of which engages a roller on the end of a lever 111 which moves with the plate 30 in swinging motion thereof around its pivotal axis 31. Said plate, of course, is biased to work holding position by spring 32.

Figure 14:
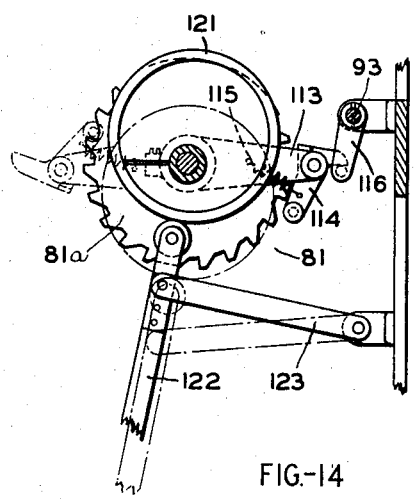
Fig. 14 is a detail sectional elevation on the line 14—14, Fig. 2.

The third clutch unit 81 operates the lifting plate of the stacking mechanism, its operating parts being shown in detail in Figs. 8 and 14. Here the ratchet wheel 81a, again pinned to the shaft 83, cooperates with a lever 113 carrying a similar bell crank latch lever 114 biased toward the ratchet wheel by a spring 115 and cooperating with a lever arm 116 pinned to instead of being rotatable on the shaft 93. Said shaft (Fig. 8) carries an arm 117 held by a spring 118 against a cam 119 on sleeve 102a, while the sleeve 120 to which lever 113 is connected is provided with a cam 121 engaging a roller on the end of a link 122 (Fig. 3), connected to one arm of the lever 77, the motion of link 122 being guided and controlled by a second link 123.

The two cams 110, 119, are so timed that in a given period after cam 110 has produced a releasing operation of the article held between the plate 30 and belt 34, cam 119 engages the arm 117, causing rotation of shaft 93, and the lever 116 thereon, which releases the clutch latch 114. The pin thereof engages with the clutch wheel 81a and one revolution movement of cam 121 moves the link 122 downwardly, rotates lever 77 counterclockwise in Fig. 3, and raises the lifting plate 38 for a stacking operation.

Figure 16:
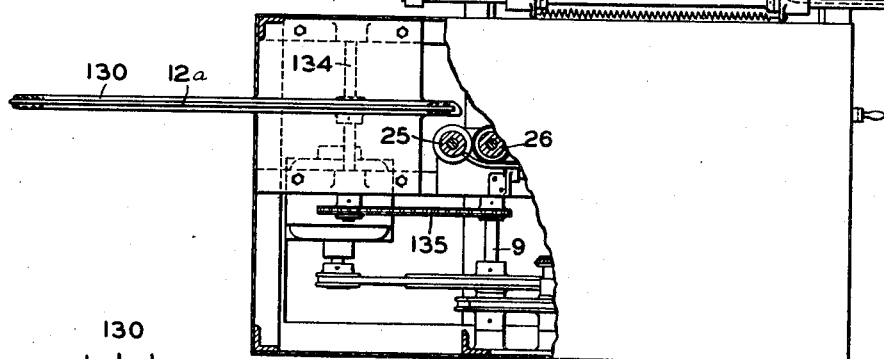
Fig. 16 is a diagrammatic view, illustrating the electric control and operating mechanism for the machine shown in Fig. 1.
Figure 16:
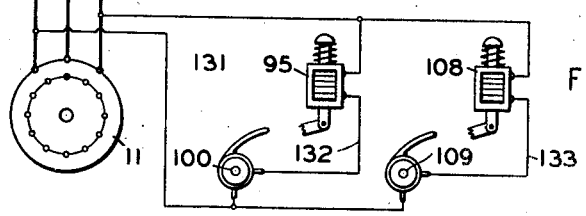

Fig. 16 diagrammatically illustrates the circuits to the motor 11 which is connected to the lead lines 130 by any suitable controlling switch (not shown). Across two of the lead lines is a control circuit marked generally 131, in parallel branches 132, 133 of which are located respectively switch 100 and solenoid 95, and in the other of which are located switch 109 and solenoid 108.

A typical operation of the machine as a whole is as follows: Assuming the motor in operation, an article to be folded is laid out flat upon the moving feed belts 3, with the longitudinal center line of the article opposite the string belt 12. As the article moves into the machine the right and left halves thereof fall downwardly over the form plate 17 until it hangs completely over the string belt and form plate, as shown in Figs. 9 and 10. During its travel roller 18 provides traction and initiates formation of the crease. When the forward edge of the article engages switch 100 the first one revolution clutch 82 is energized, the cam member of which actuates the folding blade to crease the article on a vertical center line, moving it between the folding rollers 25, 26, which carry its leading edge between plate 30 and belt 34.

When the forward edge of the now twice folded article reaches and actuates the switch 109, the second one revolution clutch 80 is operated, its cam moving the plate 30 away from the belt 34, permitting the article to drop by gravity, sliding downwardly along plate 35 until its leading edge reaches the stop ledge 37 of the stacker mechanism. At a given period after release of the plate 30, the cam 119 initiates operation of the third one revolution clutch 81, the cam 121 of which elevates the lifting plate 38 to a position above the supporting plates 40, 41, which, in the meantime, have been separated. Thereupon the supporting plates automatically move inwardly, by the effect of cam 78, and when the lifting plate moves downwardly the pile of articles is lodged upon and supported by the plates 40, 41.

Figs. 17 and 18 illustrate a modified form of the invention. Here the feed belts 3 and supporting rollers 4, 5 of the form before described have been omitted. The string belt, here numbered 12a, has been extended accordingly. Form plate 17 of the form before described has been replaced by a pair of plates 130, mounted in the framework, and which serve to support the two grooved pulleys 131, 132 over which the upper stretch of the belt travels, in addition to which said plates serve as a housing for the string belt assembly and as a guide for the overhanging sides of the article in its passage into the machine. String belt 12a here travels over a drive pulley 133 on a shaft 134 connected by a chain 135 to the main shaft 9.

The operation of this mechanism is the same as the one before described, but the article to be folded is draped directly over the string belt, thus receiving its first fold, and is conveyed thereby into the machine for subsequent operations. This machine may be readily adapted to machine feeding by supporting the feed end of the string belt 12a on a pulley, like 132, which is mounted for rotation with or forms a part of the last roll of the delivery apron of a flatwork ironer, said pulley being mounted between two adjacent ribbons thereof. In such case the article is delivered directly to the folding machine by the delivery belts of the ironer.

Again, the feed belt 3 of the form first described might readily be replaced by the delivery aprons or belts of the ironing machine itself.

In any case, a battery of folding machines of the type described, lying side by side, may be stationed at the delivery end of a flatwork ironer to receive articles from different lanes thereof.

The invention described provides a folding machine of simple construction but which accurately and neatly folds relatively limp articles first in one direction and then in the other, or by cross folds, and may also be adapted for stacking the same in the manner described.

Other advantages of the invention will be apparent to those skilled in the art.

What I claim is:

1. A folding machine, comprising elongated narrow supporting means upon which a limp flat article may be draped along a line of fold, and means for engaging the once folded article while so draped and for moving it laterally to produce a transverse fold therein.

2. A folding machine, comprising elongated narrow supporting means upon which a limp flat article may be draped along a line of fold, and a movable blade for engaging the folded article while draped upon said supporting means and for moving it laterally to produce a transverse fold therein.

3. A folding machine, comprising elongated narrow supporting means upon which a limp flat article may be draped along a line of fold, said supporting means having an open gap intermediate the ends thereof, and means for engaging said article while draped upon said supporting means and across its gap and for moving said article laterally through said gap to produce a vertically extending transverse fold therein.

4. A folding machine, comprising elongated narrow supporting means upon which a limp flat article may be draped along a line of fold, said supporting means having an open gap intermediate the ends thereof, and folding means opposite said gap.

5. A folding machine, comprising elongated narrow supporting means upon which a limp flat article may be draped along a line of fold, said supporting means having an open gap intermediate the ends thereof, a pair of folding rollers extending vertically with the bite thereof lying opposite said gap, and means operating through said gap for feeding the article to said rollers.

6. A folding machine, comprising elongated narrow supporting means upon which a limp flat article may be draped along a line of fold, said supporting means having an open gap intermediate the ends thereof, folding means opposite said gap, and means sensitive to the position of the article upon said supporting means for operating said folding means.

7. A folding machine, comprising elongated narrow supporting means upon which a limp flat article may be draped along a line of fold, said supporting means having an open gap intermediate the ends thereof, a pair of folding rollers extending vertically with the bite thereof lying opposite said gap, means operating through said gap for feeding the article to said rollers, and means sensitive to the position of the article upon said supporting means for operating said feeding means.

8. A folding machine, comprising an elongated narrow support upon which a limp flat article may be draped, means for feeding an article thereto by movement endwise of said support, and means sensitive to movement of an article upon said support for removing it therefrom.

9. A folding machine, comprising an elongated narrow support upon which a limp flat article may be draped, means for feeding an article thereto by movement endwise of said support, and an endless filament form belt having one stretch thereof alined with the upper surface of said support for feeding a draped article thereto, said belt being spaced from the receiving end of said support to provide an open gap through which an article may be removed by lateral movement.

10. A folding machine, comprising elongated narrow supporting means upon which a limp flat article may be draped along a line of fold, said supporting means having an open gap intermediate the ends thereof, folding means opposite said gap, and means beyond said folding means for releasably supporting the article with its plies in a vertical plane.

11. A folding machine, comprising elongated narrow supporting means upon which a limp flat article may be draped along a line of fold, said supporting means having an open gap intermediate the ends thereof, folding means opposite said gap, and means beyond said folding means for releasably supporting the article with its plies in a vertical plane, said means comprising a horizontally movable supporting member having a vertical surface, and means for yieldably holding the article against said surface.

12. A folding machine, comprising elongated narrow supporting means upon which a limp flat article may be draped along a line of fold, said supporting means having an open gap intermediate the ends thereof, folding means opposite said gap, means beyond said folding means for releasably supporting the article with its plies in a vertical plane, said means comprising a horizontally movable supporting member having a vertical surface, means for yieldably holding the article against said surface, and means for withdrawing said holding means to release the article.

13. A folding machine, comprising elongated narrow supporting means upon which a limp flat article may be draped along a line of fold, said supporting means having an open gap intermediate the ends thereof, folding means opposite said gap, means beyond said folding means for releasably supporting the article with its plies in a vertical plane, said means comprising a horizontally movable supporting member having a vertical surface, means for yieldably holding the article against said surface, and means sensitive to the position of the article for operating said holding means to release the article.

14. A folding machine, comprising elongated narrow supporting means upon which a limp flat article may be draped along a line of fold, said supporting means having an open gap intermediate the ends thereof, folding means opposite said gap, means beyond said folding means for releasably supporting the article with its plies in a vertical plane, said means comprising a horizontally movable supporting member having a vertical surface, means for yieldably holding the article against said surface, and means sensitive to the position of the article for operating said holding means to release the article, said last named means being adjustable to vary the position of the article when released.

15. A folding machine, comprising elongated narrow supporting means upon which a limp flat article may be draped, said means having an open gap, means sensitive to the position of the article for moving it sidewise through said gap, folding means to which the article is presented by said article moving means, clamping means for gripping the upper portion of the twice folded article to support it with its plies in a vertical plane when discharged from said folding means, and means for operating said gripping means to release the article.

16. A folding machine, comprising folding rollers having parallel vertical axes, means for feeding an article thereto while held in a vertical plane, and means on the delivery side of said rollers for supporting the article as it is being discharged therefrom.

17. A folding machine, comprising folding rollers having parallel vertical axes, means for feeding an article thereto while held in a vertical plane, and means on the delivery side of said rollers for supporting the article as it is being discharged therefrom, said means comprising a smooth plate along which the article slides, and a traveling belt arranged to press the article toward said plate.

18. A folding machine, comprising folding rollers having parallel vertical axes, means for feeding an article thereto while held in a vertical plane, and means on the delivery side of said rollers for supporting the article as it is being discharged therefrom, said means comprising a smooth plate along which the article slides, a traveling belt arranged to press the article toward said plate, and means for producing motion of separation between said belt and plate to release the article.

19. A folding machine, comprising folding rollers having parallel vertical axes, means for feeding an article thereto while held in a vertical plane, and means on the delivery side of said rollers for supporting the article as it is being discharged therefrom, said means comprising a smooth plate along which the article slides, a traveling belt arranged to press the article toward said plate, and means sensitive to motion of the article for producing motion of separation between said belt and plate to release the article.

20. A folding machine, comprising folding rollers having parallel vertical axes, means for feeding an article thereto while held in a vertical plane, and means on the delivery side of said rollers for supporting the article as it is being discharged therefrom, said means comprising a smooth plate along which the article slides, a traveling belt arranged to press the article toward said plate, and means sensitive to motion of the article for producing motion of separation between said belt and plate to release the article, said means being adjustable to vary the position of the article when released.

GEORGE W. JOHNSON.